United States Patent
Fish et al.

(10) Patent No.: US 9,940,760 B2
(45) Date of Patent: Apr. 10, 2018

(54) SYSTEM AND METHOD FOR FACILITATED COLLABORATION BETWEEN AUTOMOTIVE MECHANICS

(71) Applicant: Robert Bosch GmbH, Stuttgart (DE)

(72) Inventors: James T. Fish, Birmingham, MI (US); Tanvir Arfi, Northville, MI (US)

(73) Assignees: Bosch Automotive Service Solutions Inc., Warren, MI (US); Robert Bosch GmbH, Stuttgart (DE)

( * ) Notice: Subject to any disclaimer, the term of this patent is extended or adjusted under 35 U.S.C. 154(b) by 22 days.

(21) Appl. No.: 15/104,932

(22) PCT Filed: Dec. 22, 2014

(86) PCT No.: PCT/US2014/071864
§ 371 (c)(1),
(2) Date: Jun. 15, 2016

(87) PCT Pub. No.: WO2015/100228
PCT Pub. Date: Jul. 2, 2015

(65) Prior Publication Data
US 2016/0314627 A1    Oct. 27, 2016

Related U.S. Application Data

(60) Provisional application No. 61/920,126, filed on Dec. 23, 2013, provisional application No. 61/922,190, filed on Dec. 31, 2013.

(51) Int. Cl.
*G01M 17/00* (2006.01)
*G07C 5/00* (2006.01)
(Continued)

(52) U.S. Cl.
CPC ........... *G07C 5/008* (2013.01); *G07C 5/0808* (2013.01); *H04L 65/1069* (2013.01); *H04L 65/1073* (2013.01)

(58) Field of Classification Search
CPC ........ B60R 16/02; B60R 16/023; G01M 17/00
(Continued)

(56) References Cited

U.S. PATENT DOCUMENTS 7,050,892 B1 * 5/2006 Liebl ................... G06F 21/121
701/32.6
8,744,668 B2 * 6/2014 Selkirk ................ G07C 5/008
340/438

(Continued)

FOREIGN PATENT DOCUMENTS

WO    02/090918 A2    11/2002

OTHER PUBLICATIONS

International Search Report corresponding to PCT Application No. PCT/US2014/071864, dated Apr. 9, 2015 (3 pages).

*Primary Examiner* — Tan Q Nguyen
(74) *Attorney, Agent, or Firm* — Maginot Moore & Beck LLP (57) ABSTRACT

A method for facilitating communication for diagnosis of automotive repair issues includes retrieving diagnostic data from a first processor in a first vehicle using a first diagnostic tool, and transmitting the diagnostic data to a server with a request for assistance from a first user who operates the first diagnostic tool. The server identifies a second user who has received diagnostic data from a second processor in a second vehicle with a second diagnostic tool that corresponds to the diagnostic data retrieved by the first processor in the first vehicle, and the server transmits a communication notification to an electronic communication device that is associated with the second user to establish a communication channel between the first user and second user regarding the vehicle issue.

18 Claims, 4 Drawing Sheets

(51) Int. Cl.
  *G07C 5/08*   (2006.01)
  *H04L 29/06*  (2006.01)
  *B60R 16/02*  (2006.01)
(58) Field of Classification Search
  USPC .................................................. 701/29.6
  See application file for complete search history.

(56) References Cited

U.S. PATENT DOCUMENTS

| | | | |
|---|---|---|---|
| 2005/0065678 A1* | 3/2005 | Smith | G07C 5/008 |
| | | | 701/31.4 |
| 2007/0083303 A1* | 4/2007 | O'Sullivan | G07C 5/006 |
| | | | 701/31.4 |
| 2007/0244611 A1 | 10/2007 | Brozovich | |
| 2010/0138701 A1 | 6/2010 | Costantino | |
| 2013/0030640 A1 | 1/2013 | Keane | |
| 2013/0304278 A1 | 11/2013 | Chen | |

* cited by examiner

SYSTEM AND METHOD FOR FACILITATED COLLABORATION BETWEEN AUTOMOTIVE MECHANICS

CLAIM OF PRIORITY

This application is a 35 U.S.C. § 371 National Stage Application of PCT/US 2014/0718664, filed on Dec. 22, 2014, which claims the benefit of priority to (i) U.S. Provisional Application No. 61/920,126, which is entitled "System And Method For Facilitated Collaboration Between Automotive Mechanics," and was filed on Dec. 23, 2013, and (ii) U.S. Provisional Application No. 61/922,190, which is entitled "System And Method For Incentivization In An Automotive Diagnostic System," and was filed on Dec. 31, 2013, the entire disclosures of which are hereby incorporated by reference herein.

TECHNICAL FIELD

This disclosure relates generally to automotive maintenance systems and, more particularly, to automotive diagnostic systems that facilitate collaboration between automotive mechanics.

BACKGROUND

In recent years, vehicles and the field of automotive maintenance have experienced rapid growth in computerized systems both within automotive vehicles and in computerized diagnostic tools that identify maintenance issues with the vehicles. Modern vehicles include one or more computer systems that are often referred to as an electronic control unit (ECU). In some vehicles, the ECU controls and monitors the operations of numerous systems including, but not limited to, the engine, steering, tires, transmission, brakes, fuel delivery or battery level monitoring, and climate control systems. Some vehicles also include numerous sensors that monitor various aspects of the operation of the vehicle. The ECU receives the sensor data and is configured to generate diagnostic trouble codes (DTCs) if the sensors indicate that one or more systems in the vehicle may be failing or operating outside of predetermined parameters.

Many vehicles use the controller area network (CAN) vehicle bus to transmit data between the ECU and the onboard sensors and components in the vehicle. The CAN bus, or other equivalent data networks in a vehicle, provides a common communication framework between the ECU and the various sensors and systems in the vehicle. Additionally, the CAN bus or equivalent network enables communication between the ECU and external diagnostic tools. Diagnostic tools are also digital computers with communication ports and input/output devices, including display screens and input control buttons, which relay information to a mechanic and enable the mechanic to perform tests and send commands to the ECU. The ECU and diagnostic tools often use an industry standard protocol, such as a version of the onboard diagnostics (OBD) protocol, including the OBD-II protocol. Automotive mechanics and service professionals use a wide range of digital diagnostic tools to interface with the ECUs in vehicles both to diagnose issues with the vehicles, which are often indicated by DTC data from the ECU.

While automotive diagnostic tools are in widespread use today, the diagnostic tools are limited to use by an individual mechanic as part of a diagnostic procedure. In some instances, the DTC data and other diagnostic information from the vehicle does not provide enough information for a mechanic to diagnose and repair the vehicle. Consequently, improvements to vehicle diagnostic systems and diagnostic tools that provide access to additional information and suggestions for repair procedures based on the DTC and other diagnostic data from a vehicle would be beneficial.

SUMMARY

A method for facilitating communication for diagnosis of automotive repair issues includes retrieving diagnostic data from a first processor in a first vehicle using a first diagnostic tool, and transmitting the diagnostic data to a server with a request for assistance from a first mechanic who operates the first diagnostic tool. The server identifies a second user who has received diagnostic data from a second processor in a second vehicle with a second diagnostic tool that corresponds to the diagnostic data retrieved from the first processor in the first vehicle, and the server transmits a communication notification to a mobile device that is associated with the second user to establish a communication channel between the first user and second user regarding the vehicle issue.

In another embodiment, a method of operating a vehicle diagnostic system has been developed. The method includes retrieving diagnostic data from a first processor in a first vehicle using a first diagnostic tool in response to connection of the diagnostic tool to the processor by a first user, transmitting with the first diagnostic tool the diagnostic data to a server, identifying with the server a first repair procedure in a plurality of repair procedures with reference to a plurality of rankings for the plurality of repair procedures corresponding to the diagnostic data from the first diagnostic tool, the first repair procedure having a highest ranking in the plurality of rankings, transmitting with the server the first repair procedure to the first diagnostic tool, transmitting feedback from the first diagnostic tool corresponding to effectiveness of the first repair procedure, and updating with the server the ranking associated with the first repair procedure in response to the feedback.

In another embodiment, a diagnostic analysis system that facilitates communication between multiple users has been developed. The system includes a first diagnostic tool associated with a first user, a second diagnostic tool associated with a second user, a server, and an electronic communication device associated with the second user. The first diagnostic tool is configured to retrieve diagnostic data from a first processor in a first vehicle, transmit the diagnostic data to the server, and transmit a request for assistance regarding a vehicle issue corresponding to the diagnostic data to the server. The server is configured to identify registration data associated with a second user who has received diagnostic data from a second processor in a second vehicle with the second diagnostic tool that corresponds to the diagnostic data retrieved from the first processor in the first vehicle, and transmit a communication notification from the server to the electronic communication device that is associated with the second user to establish a communication channel between the first user and the second user for communication regarding the vehicle issue.

In another embodiment, a method of operating a vehicle diagnostic system that provides incentives to user activity in the vehicle diagnostic system has been developed. The method includes monitoring with a server an electronic communication from an electronic device associated with a user of the vehicle diagnostic system, identifying with the server a user activity in the vehicle diagnostic system with reference to the electronic communication, assigning with the server at least one reward point to an account associated with the user in response to the user activity, and redeeming with the server at least one reward point associated with the user account to provide a benefit to the user in response to a request to redeem the at least one reward point received through a web portal associated with the server.

DETAILED DESCRIPTION

For the purposes of promoting an understanding of the principles of the embodiments described herein, reference is now be made to the drawings and descriptions in the following written specification. No limitation to the scope of the subject matter is intended by the references. This patent also includes any alterations and modifications to the illustrated embodiments and includes further applications of the principles of the described embodiments as would normally occur to one skilled in the art to which this document pertains.

As used herein, the term "manual assistance" refers to a process of communication between two or more users, such as mechanics or automotive technicians, to help one of the users diagnose and resolve a maintenance issue with a vehicle. As described in more detail below, an automotive diagnostic system facilitates the manual assistance process to identify a user with the knowledge to assist another user to resolve a maintenance issue, and to provide communication between the users who are often not in the same physical location.

As used herein, the term "electronic communication device" refers to any device that enables a user to communicate with a diagnostic analysis system to receive information regarding an issue with a vehicle and to communicate with at least one other remote user using a data network to receive manual assistance. Examples of electronic communication devices include, but are not limited to, mobile devices such as smartphones, tablet computers, and other mobile digital computing devices, wearable computing devices, and automotive diagnostic tools that are configured to communicate via a data network. Other examples of electronic communication devices include telephones or desktop personal computers (PCs) that are operatively connected to a network. As described below, different electronic communication devices enable communication using text, audio, video, photographic, and vehicle diagnostic data to provide a user with automated and manual assistance during the diagnosis and repair of an issue with a vehicle.

As used herein, the term "reward point" refers to a quantification of a reward that is assigned to a user, such as a mechanic, when the user performs one or more activities using a diagnostic tool during the course of vehicle maintenance. In one embodiment, reward points are numeric quantifiers that are added to a reward point total for the user. The user accesses a web portal to review the status of reward points and the user redeems the reward points to receive discounts on purchases or other benefits such as sending assistance requests to other system users with high feedback scores in exchange for use of the vehicle diagnostic analysis system. As described below, a diagnostic reward system records the activity of the diagnostic tool and assigns various quantities of reward points to the user based on the activities of the user in the vehicle diagnostic analysis system.

Figure 1:
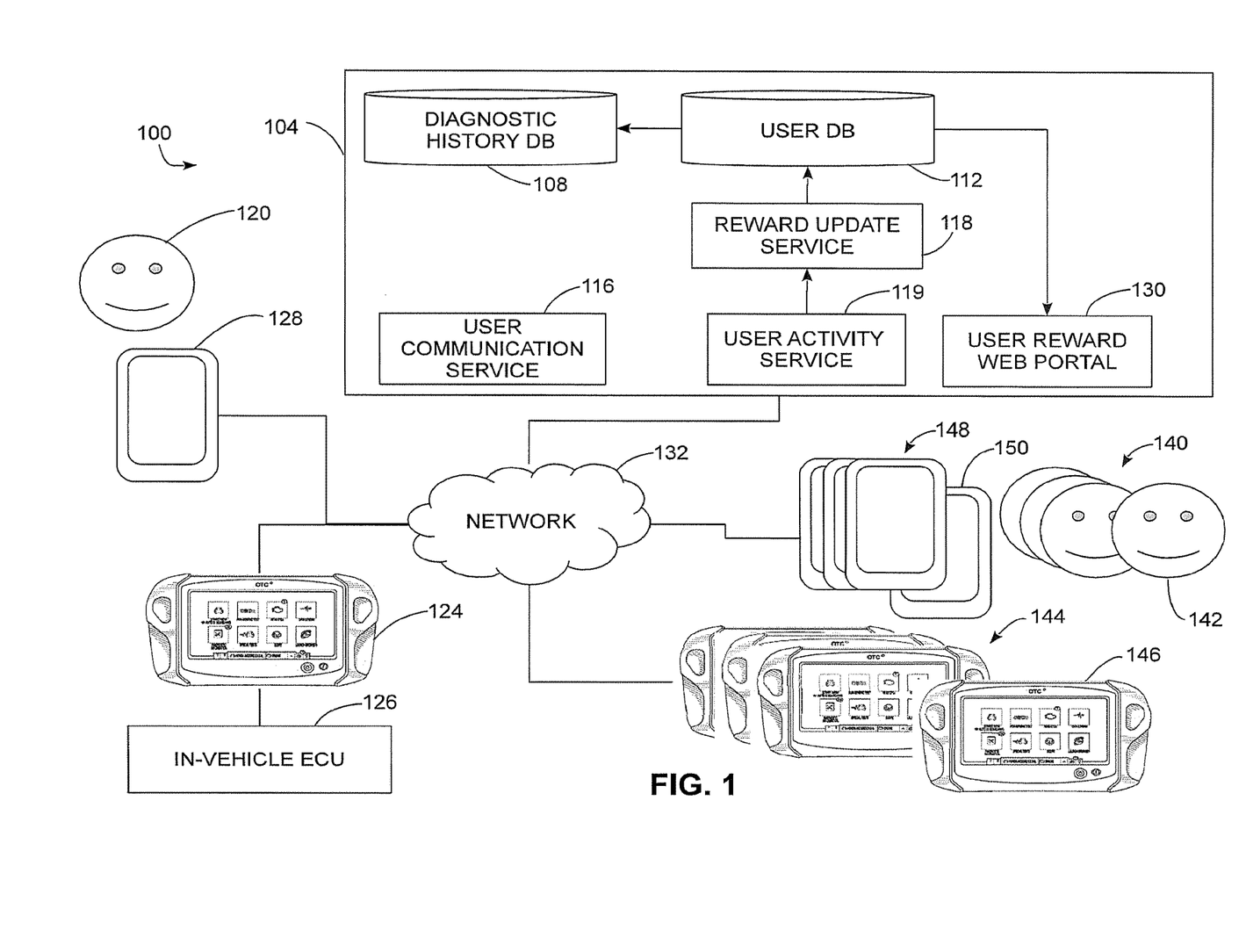
FIG. 1 is a schematic diagram of a vehicle diagnostic system that facilitates communication between users to diagnose and repair issues with vehicles and incentivize user activities.

FIG. 1 depicts a diagnostic analysis system 100 that facilitates the generation of automated suggestions for diagnostic and repair procedures related to vehicle repair issues using stored diagnostic records and that further promotes communication between users when the stored diagnostic records do not provide a solution to the issue. The system 100 includes a diagnostic analysis server 104, a diagnostic tool 124 and mobile device 128 that are associated with a first user 120, and a plurality of diagnostic tools 144 and mobile devices 148 that are associated with a plurality of other users 140. In the system 100, the diagnostic analysis server 104, mobile devices 128 and 148, and diagnostic tools 124 and 144 are communicatively coupled through a network 132, such as a local area network (LAN) or wide area network (WAN). The diagnostic tools 124 and 144 and the mobile devices 128 and 148 are illustrative embodiments of electronic communication devices in the system 100. In the system 100, the first user 120 and user population 140 are typically automotive mechanics, automotive technicians, or other users who engage in automotive maintenance and repair.

In the illustrative example of FIG. 1, the first user 120 connects the diagnostic tool 124 to an ECU 126 in a vehicle. As described in more detail below, the diagnostic tool 124 retrieves diagnostic records from the diagnostic analysis server 104 to assist in diagnosis and repair of an issue with a vehicle. In some instances, the diagnostic analysis server 104 also provides a channel for communication between the user 120 and other users 140 whom the diagnostic analysis server 104 identifies as having prior experience with similar vehicle issues. The diagnostic analysis server 104 identifies registration data for the other users 140 who operate diagnostic tools 148 that have transmitted similar diagnostic data to the diagnostic analysis server 104 prior to receiving the diagnostic data and request for assistance from the diagnostic tool 124. The diagnostic analysis server 104 provides both live and deferred communications for the user 120 to use the diagnostic tool 124 or mobile device for communication with corresponding diagnostic tools 144 and mobile devices 148 that are associated with the other users 140.

In the system 100, the diagnostic analysis server 104 is a computing system that includes a diagnostic history database 108, user database 112, user communication service 116, reward update service 118, user activity service 119, and user reward web portal 130. In a large scale embodiment, the diagnostic analysis server 104 includes multiple servers in a clustered configuration with multiple digital processors, network interface devices, and data storage devices including solid-state or magnetic disk data storage devices that are arranged in a redundant array of independent disks (RAID). In one embodiment, the servers are connected to the data storage devices through a storage area network (SAN) configuration, a network-attached storage (NAS) configuration, or any other suitable configuration that enables the servers to access stored data.

In the diagnostic analysis server 104, the diagnostic history database 108 stores diagnostic records that associate vehicle and diagnostic data received from a diagnostic tool with repair procedures to correct the corresponding issues in a vehicle. The repair procedures in each of the diagnostic records include information pertaining to diagnosis and repair of an issue that affects a vehicle. A repair procedure includes advice from one or more users about the potential cause of the issue and instructions to repair the issue. The diagnostic history database 108 stores repair procedures in the form of text, but a diagnostic record optionally includes digital photographs, video, audio, and other media as part of the repair procedure. The diagnostic records optionally include additional structured data that may be relevant to a wide range of vehicle issues. For example, in one embodiment the diagnostic records include an estimate of the time required to diagnose and repair the issue associated with the diagnostic record, a list of required replacement components with a universal product code (UPC) or other identification code that enables automatic ordering of the parts, and a list of repair tools that are required to perform the repair procedure.

Each diagnostic record includes diagnostic trouble codes (DTCs) or other diagnostic information that a diagnostic tool generated when the issue was encountered in the past. The diagnostic records are also associated with a vehicle identification number (VIN) or other identification information for the make, model, and year of the vehicle that experienced the issue. As described below, in the system 100 a diagnostic tool retrieves the diagnostic information and vehicle identification information from an ECU in a vehicle to enable automated retrieval of one or more corresponding diagnostic records from the diagnostic history database 108.

In the diagnostic analysis server 104, the user database 112 stores user account registration data, an activity history, and user reward point information for a plurality of users, such as the users 120 and 140, who are registered users of the diagnostic analysis server 104. The user database 112 stores login information to enable the users to access the diagnostic analysis server 104 in a secure manner. The user database 112 also stores login information to enable the mechanics to access the user reward web portal 130 in a secure manner using, for example, the mobile device 128. In one embodiment, the diagnostic tool 124 stores a cryptographic key, password hashes, or other login credential data that are associated with the user 120, and the diagnostic tools 144 are associated with the users 140 in a similar manner. The user database 112 also stores login credential data for the mobile devices 128 and 148 in association with the user accounts for the users 120 and 140, respectively. The user database 112 optionally stores account information for each user including, for example, screen names and graphical avatars for use with the user communication service 116, and a set of contact information that each user chooses to share with some or all of the other users including, for example, email addresses, telephone numbers, social network identities, and other contact information for the user. The address information enables the user communication service 116 in the diagnostic analysis server 104 to transmit communication messages to the diagnostic tools 144 and electronic communication devices 148 that are associated with the users 140.

The user database 112 also stores a history of user interactions with other users in the system 100 and with the diagnostic records that are stored in the diagnostic history database 108. For example, the user interaction history associates the account of a user who receives a particular set of diagnostic data from a vehicle with one or more diagnostic records that correspond to the diagnostic data in the diagnostic database 108. In the system 100, the diagnostic tools 124 and 144 transmit the diagnostic data to the diagnostic analysis server 104 in an automated manner to indicate that a user who uses the diagnostic tool has encountered DTCs or other diagnostic data that are associated with the diagnostic record. The user history also includes a record of how often a user requests manual assistance and responds to requests from other users for manual assistance. The diagnostic analysis server 104 uses the history of activities for each user to identify the types of maintenance procedures that each user performs with regularity and to identify the makes, models, and years of vehicles that each user diagnoses and repairs. As described below, the diagnostic analysis server 104 uses the history for each user to identify the user accounts that are associated with different users for requesting manual assistance when another user encounters difficulty in diagnosing and repairing an issue with a vehicle.

In the system 100, the user communication service 116 receives requests from a user, such as the user 120, for contact with one or more other registered users to resolve a maintenance issue with a vehicle. The diagnostic tool 124 transmits DTCs and the VIN for the vehicle to the diagnostic analysis server 104, and the communication service uses the information and user information from the user database 112 to identify one or more accounts of users who receive a request to assist with the diagnosis and repair process. In one embodiment, the user communication service 116 implements a chat service using, for example, the XMPP protocol, WebRTC protocol, or another suitable communication protocol. The communication service 116 enables the exchange of text data between users, and in some embodiments enables the transmission of photographs, video, and audio between the diagnostic tools and mobile devices that are associated with registered user accounts. As described below, the user communication service 116 identifies when a user is available or unavailable for communication, and provides services for both live communication when two or more users are available and for deferred communication when the users are not available concurrently.

In the system 100, the user activity service 119 is a server program that monitors the activities of the users, including the mechanics 120 and 140 and other users who interact with the diagnostic system 100, to identify the types of activities and quantities of activities that different users perform. For the user activity service 119 monitors the activities of the user 120 when the user 120 uses an electronic device, such as the mobile electronic device 128, to submit a query to the diagnostic analysis server 104 or submit an answer for a query from another one of the users 140. The reward update service 118 receives a notification of the recorded type of user activity from the user activity service 119 and updates the number of reward points that are associated with the user in the user database 112. The user activity service 119 also monitors the transmission of diagnostic data and records of activity from the diagnostic tools 124 and 144 that the diagnostic analysis server 104 receives through the network 132. For example, the user activity service 119 receives data from the diagnostic tool 124 as the user 120 uses the diagnostic tool. The diagnostic tool 124 transmits diagnostic data and information about the actions of the user 120, such as the diagnostic and testing functions that the user 120 uses when operating the diagnostic tool 124. In the embodiment of FIG. 1, the diagnostic tool 124 transmits the diagnostic and user activity data to the user activity service 119 in an automated manner without requiring additional input from the user 120.

In the system 100, the reward update service 118 is a server program that updates the rewards provided to one of the users of the diagnostic analysis server 104 in response to user activity. The reward update service 118 receives information about the activities of one or more users, such as the users 120 and 140 in FIG. 1, and generates a quantified reward for the users based on the type and quantity of the user activity. The reward update service 118 stores the information about the rewards for the users in the user database 112 in association with the account information of the user who performs the action that receives a reward. In one embodiment, the rewards are stored as numeric reward points for the user. The reward update service 118 receives information about the type of activity that the user performs with the diagnostic analysis server 104 and assigns reward points based on a predetermined relationship between the type of activity and the reward for the activity. For example, in one configuration the reward update service 118 assigns a first number of reward points to a user for requesting assistance from the diagnostic server 104 for diagnosing an issue with a motor vehicle. The reward update service 118 assigns a greater number of reward points to an account of the user 142 who provides an answer to the query from the user 120. Additionally, in one configuration the reward update service 118 assigns a variable number of reward points to the user account of the user 142 based on feedback from the user 120 to identify the usefulness of the submitted answer to generate a larger number of reward points for answers that receive positive feedback. Thus, in some configurations the system 100 provides greater rewards for user activities that assist other users and provide additional value to the diagnostic system 100. The users receive additional rewards for continued interaction with the diagnostic system 100.

In the system 100, the user reward web portal 130 is a web server that provides an interface for registered users, such as the user 120, to review the status of reward points. The reward web portal 130 also displays goods and services for purchase, and provides an interface for the user 120 to redeem the reward points for discounts when purchasing the goods or services. The user 120 accesses the user reward web portal 130 through a web application that is installed on the diagnostic tool 124, the mobile electronic communication device 128, or using another computing device such as a personal computer (PC). The user reward web portal 130 implements the transport layer security (TLS) or other appropriate encryption and authentication protocols to provide a secure communication channel through the network 132 for the user 120 to purchase items using a credit card or other online payment method.

In the system 100, the diagnostic tools 124 and 144 are computing devices that include internal processors, memories, user input/output devices, data ports for communication with in-vehicle ECUs, and network interface devices for communication with the diagnostic analysis server 104 through the network 132. In the embodiment of FIG. 1, each of the diagnostic tools 124 and 144 includes a touchscreen interface that displays a graphical user interface (GUI) and accepts input in response to user contact with the touchscreen. The touch input includes finger presses or input gestures using one or more fingers. FIG. 1 depicts the ECU 126 in a vehicle that is operatively connected to the diagnostic tool 124 through an OBD-II port or other suitable data port in the vehicle. The diagnostic tool 124 retrieves diagnostic data, including one or more DTCs, and the VIN or other vehicle identification data from the ECU 126. The diagnostic tool 124 transmits the diagnostic and VIN data to the diagnostic analysis server 104 in association with the user account for the user 120, and the diagnostic analysis server 104 stores the data in association with the user account to identify that the user 120 has encountered a particular set of diagnostic data while performing service for a vehicle. The diagnostic tool 124 also uses the diagnostic and vehicle identification data to generate a query for the diagnostic analysis server 104 in situations where the user 120 requests additional information about a maintenance issue with the vehicle. As described in more detail below, the diagnostic tool 124 also executes a communication application that enables the user 120 to communicate with the diagnostic tools 144 and mobile devices 148 that are associated with one or more of the other users 140.

In the system 100, the mobile devices 128 and 148 are electronic communication devices that enable communication between the user 120 and one or more of the users 140 using the diagnostic analysis server 104 and the network 132. The mobile devices 128 and 148 are, for example, smartphones, tablets, wearable computing devices, or other mobile computing devices that are each associated with one of the users. Each mobile device is a computing device with a processor, memory, graphical display, and one or more wireless networking devices. Some mobile devices include cameras, microphones, and other sensors that can record additional data to assist in documenting diagnostic and repair procedures for a vehicle. In the system 100, each mobile device executes a software application that enables each of the users 120 and 140 to communicate with the diagnostic analysis server 104. In one embodiment, the application that is executed with the mobile devices 128 and 148 is similar to the software application that is executed by the diagnostic tools 124 and 144, but the mobile devices 128 and 148 are typically used to facilitate review of data from the diagnostic analysis server 104 and communication between users when the user is not in the immediate vicinity of the vehicle and a diagnostic tool that is operatively connected to the ECU 126. The mobile devices 128 and 148 also provide communication between users if the diagnostic tools 124 or 144 are disconnected from the network 132. In one embodiment, the communication service 116 in the diagnostic analysis server 104 stores a trouble ticket or other identifier that is associated with a vehicle maintenance issue. The diagnostic analysis server 104 generates the identifier for the issue when the diagnostic tool transmits a request for automated or manual assistance to resolve an issue, and removes the identifier in response to receiving a message indicating that the issue has been resolved. The mobile device displays one or more identifiers corresponding to the pending vehicle issues to enable a user to retrieve diagnostic records from the diagnostic analysis server 104 and communicate with other users about the identified issue.

In the system 100, the diagnostic analysis server 104 stores one or more electronic contact addresses for each of the identified registered users, including the user 120, and a plurality of other users 140 in the user database 112. Each of the user accounts is associated with one or more diagnostic tools, such as the diagnostic tools 124 and 144, and one or more mobile devices, such as the mobile devices 148. The user database 112 stores registration data for the registered users 120 and 140 including, but not necessarily limited to, an online chat accounts that are registered with the communication service 116, email addresses, instant messaging accounts, contact addresses with one or more social networking services, telephone numbers, and the like.

FIG. 1 depicts an example of a user 142 in the population of users 140 who is associated with one diagnostic tool 146 in the group of diagnostic tools 144 and an electronic communication device, such as the mobile device 150 in the group of mobile devices 148 that is registered with the diagnostic analysis server 104. In the system 100, the user communication service 116 enables communication between the first user 120 and the second user 142 using either diagnostic tools or mobile devices. For example, the users 120 and 142 communicate via an online chat session using the diagnostic tools 124 and 146, respectively, or the mobile devices 128 and 150, respectively. As described below, when the user 120 enters a request for manual assistance, the diagnostic analysis server 104 automatically identifies one or more user accounts that are associated with the users 140 based on the diagnostic information from the diagnostic tool 124 and diagnostic records in the diagnostic history database 108.

Each of the diagnostic tools 124 and 146 implements a chat client program that enables communication between registered users for "live" communication. In the system 100, the mobile devices 128 and 150 also implement a chat application that is compatible with the user communication service 116. The user communication service 116 enables both live and deferred interactions between the user 120 and one or more of the users 140. For example, the user communication service 116 generates an automated request for contact with one or more of the users 140 through a chat application in the diagnostic tools 144 or the mobile devices 148.

In a live operating mode, one or more of the other users 140 respond to the request and interact with the user 120 directly. The live interaction includes, for example, an exchange of text data or voice communication using, for example, a voice over internet protocol (VoIP) communication channel. In one embodiment, the user 120 uses one or more cameras and microphones in the mobile device 128 to stream audio and video to the mobile device 150 or diagnostic tool 146 that is associated with the other user 142. During live interaction, the diagnostic tool 124 optionally transmits OBD-II diagnostic data to the diagnostic tool 146 or mobile device 150 to enable the user 142 to review the diagnostic data in a similar manner to the user 120. In one embodiment, the user communication service 116 stores a record of the text or other communications between the users to assist in the generation of a repair procedure for a diagnostic record when the user 120 resolves the issue to repair the vehicle.

In the system 100, deferred interaction occurs when either the user 120 who has the issue or the contacted user 142 is unavailable for live communication. The user communication service 116 displays an "available" or "unavailable" status for the user accounts based on the activity of the users 120 and 142. The deferred communication includes, for example, messages that are sent between the users 120 and 142 for later review. The user communication service 116 includes a push notification functionality that generates a visual or audible alert when a new message is received. The users 120 and 142 receive the notifications using the chat applications in either the respective diagnostic tools or mobile devices. The users 120 and 142 can respond to the push notification through an interaction process to initiate live communication or through correspondence with a series of deferred messages that the users 120 and 142 review at different times.

While FIG. 1 depicts a one-to-one communication process between the user 120 and the diagnostic tool 146 and mobile device 150 for a single selected user 142, the system 100 also enables one-to-many and many-to-many communication processes. For example, the user 120 can communicate with more than one of the users 140 regarding an issue in a one-to-many configuration, and the users 140 communicate with each other through the user communication service 116 using the diagnostic tools 144 and mobile devices 148.

Figure 2:
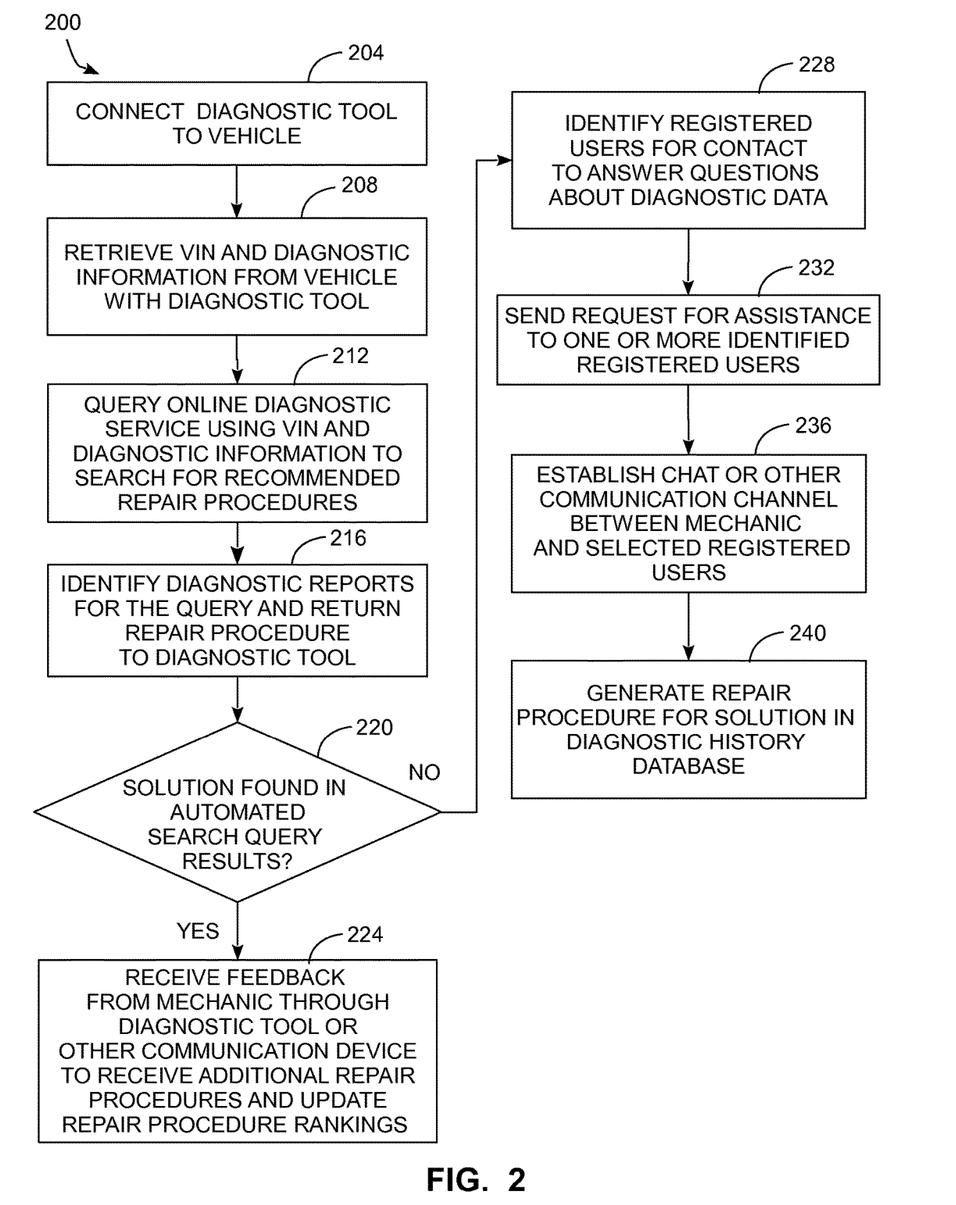
FIG. 2 is a block diagram of a process for using an automotive diagnostic system for facilitation of communications between automotive mechanics.

FIG. 2 depicts a process 200 for the operation of the system 100 to enable the user 120 to retrieve recommendations for repairs and, if required, to contact other users to assist in diagnosis of mechanical issues. In the discussion below, a reference to the process 200 performing a function or action refers to the execution of stored program instructions by a processor to perform the function or action. Process 200 is described with reference to the system 100 of FIG. 1 for illustrative purposes.

Process 200 begins when the user 120 or other automotive service technician connects a diagnostic tool to the ECU in a vehicle (block 204). As described above, the diagnostic tool 124 is configured to interface with a CAN bus or other in-vehicle data networking interface to retrieve diagnostic data from the ECU 126.

Once connected to the ECU 126, the diagnostic tool 124 receives diagnostic data and optionally receives the VIN or other vehicle information data from the ECU 126 (block 208). The diagnostic data include, but are not necessarily limited to, DTC data, recorded sensor history data, and present-time data from sensors in the vehicle that are transmitted in an OBD-II compatible format. In one embodiment, the diagnostic tool 124 receives the VIN or other vehicle identification data from the ECU 126 in addition to receiving using, for example, the OBD-II mode 9 protocol. In another embodiment, the user 120 enters the VIN or other identification information for the vehicle manually or through a barcode scanner to provide the VIN to the diagnostic tool 124.

During process 200, the user 120 enters a query using the diagnostic tool 124 for diagnosis and service recommendations based on the DTCs and other diagnostic data that have been received from the ECU (block 212). The query includes both the diagnostic data and the VIN for the vehicle. During the process 200, the diagnostic tool 124 generates the query with the diagnostic data and VIN in an automated manner. The user 120 optionally enters additional terms for the query using touchscreen interface or other input device associated with the diagnostic tool 124. In one example, the diagnostic tool 124 generates a query including two DTCs that are received from the ECU 126, the VIN for the vehicle, and a manually entered search term for "grinding noise" to complement the diagnostic data with observations from the user 120 about the vehicle to assist in diagnosis of the issue.

The diagnostic analysis server 104 receives the query from the diagnostic tool 124, identifies query results from the diagnostic information in the diagnostic history database 108, and returns repair procedures corresponding to the diagnostic information to the diagnostic tool 124 (block 216). In one embodiment, the diagnostic analysis server 104 queries the diagnostic history database 108 first to identify if the combination of DTCs and other diagnostic data that are presented in the query correspond to one or more repair procedure records that are stored in the diagnostic history database 108. The diagnostic history database 108 stores repair procedures of previously recorded solutions to a vehicle issue that correspond to the same or similar diagnostic data, such as a set of one or more DTCs for a given vehicle make and model. The diagnostic analysis server 104 also refines the search using the VIN or other vehicle identification data in the query. The diagnostic analysis server 104 uses the VIN to associate the make, model, and year of the vehicle with existing diagnostic records to identify the records for similar vehicles with the greatest likelihood of relevance to the user 120. If the DTC data corresponds to one or more diagnostic records, but the diagnostic history database 108 does not associate the DTC data with the particular VIN of the vehicle, then the diagnostic analysis server 104 returns results for the diagnostic records that correspond to the DTCs, with an indicator that identifies the different make, model, or year of the vehicles that pertain to the diagnostic records.

In one embodiment, the diagnostic analysis server 104 implements a web server, and the results from the query are presented as one or more web pages for display through the diagnostic tool 124 or any other computing device that includes a web browser. If the query results in multiple potentially relevant results, the diagnostic analysis server 104 generates results including brief summary information and hyperlinks or other control elements to enable the user 120 to review multiple results using a web browser or other suitable viewing software with the diagnostic tool 124.

During process 200, the user reviews the results from the search and determines if one of the diagnostic records describes a solution to the vehicle repair issue. In the system 100, the diagnostic tool 124 implements a web browser or other software that enables the user 120 to review the diagnostic records. In another embodiment, the user 120 uses the mobile device 128 or another computing device, such as a personal computer (PC), to review the results.

In many instances, the results from the diagnostic analysis server 104 include an appropriate solution for the user to fix the issue with the vehicle (block 220). The user 120 then enters feedback using the diagnostic tool 124 or mobile device 128 to update the diagnostic history database 108 (block 224). Since many automotive repairs can take hours or even days to complete, the diagnostic analysis server 104 is configured to receive the feedback after the user 120 has had an opportunity to perform a recommended procedure and verify the efficacy of the procedure. For example, in one embodiment the diagnostic tool 124 presents a feedback menu to the user 120 after a timeout period. The timeout is a predetermined time period (e.g. 24 hours) or a timeout that is based on an expected amount of time to perform the repair based on a time estimate that is included with the diagnostic records. For example, the diagnostic tool 124 presents the feedback interface for a diagnostic record with a recommendation for a job with an estimated 8 hour completion time after the estimated time has elapsed.

The diagnostic analysis server 104 uses the simplified feedback to adjust a relevance ranking of the service repair procedures that correspond to the feedback. For example, as one or more users review a repair procedure for a particular set of DTCs, positive feedback indicates that the repair procedure was useful in fixing the problem with the vehicle. The positive feedback increases the ranking for the repair procedure that the diagnostic analysis server 104 returns in response to additional queries that specify the DTCs or other diagnostic and vehicle identification data corresponding to the diagnostic record. When the analysis server 104 identified multiple repair procedures in response to a query, the diagnostic analysis server 104 selects the highest ranked repair procedure first, and returns one or more lower ranked repair procedures, such as a second highest ranked repair procedure, third highest ranked repair procedure, etc. if the diagnostic analysis server 104 receives negative feedback in response to the first repair procedure. In one embodiment, the diagnostic analysis server 104 returns repair procedures in order of rank until the user 120 identifies a repair procedure that is a solution to the mechanical issue or the diagnostic analysis server 104 receives the request to contact another one of the users 140 because none of the repair procedures appear to be valid solutions for the vehicle issue. Negative feedback decreases the ranking of a repair procedure based on the diagnostic data that are associated with the issue. In one configuration, if a diagnostic record receives a predetermined number of negative feedback results, while having no or few positive feedback results, then the diagnostic analysis server 104 omits the diagnostic record from search query results.

In the system 100, the feedback interface includes both simplified and detailed input controls for the user 120. For example, a simplified feedback interface includes a summary of the vehicle and DTC information and the recommended diagnosis to remind the user 120 of a diagnostic record that was previously retrieved for a vehicle. The simplified feedback interface also presents a yes/no or a multiple-choice question for the user 120 to elicit feedback as to whether the diagnostic record was useful in solving the problem. The simplified feedback interface receives the feedback input in a standardized manner that requires minimal time for the user 120. The feedback interface also presents a detailed input interface. The detailed input interface is, for example, a form that includes more detailed questions about the repair process (e.g. time needed for the repair, parts used in the repair, tools used for the repair, etc.) and a text input to enable the user 120 to enter an explanation of the problem and the repair process. The detailed feedback is useful when the user 120 receives diagnostic records that assist the user 120 in diagnosing and fixing the problem, and where the user 120 wants to add additional details to existing diagnostic records that are stored in the diagnostic history database 108.

In some instances, the user 120 is unable to resolve the repair issue with the vehicle using the diagnostic records that that diagnostic analysis server 104 returns in response to the query from the diagnostic tool 124 (block 220). In a situation where the diagnostic analysis server 104 does not identify a relevant diagnostic record or where the user 120 does not receive a repair procedure that solves the repair issue, the user 120 uses the diagnostic tool 124 or mobile device 128 to request manual assistance for information corresponding to the query. The diagnostic analysis server 104 identifies the registration data for one or more registered users in the user database 112 who receive contact requests to address the diagnostic issue (block 228). The registration data for the users includes, for example, the email address, telephone number, chat account name, or other addressing information that enables the user communication service 116 to establish the communication channel between the diagnostic tool 124 or electronic communication device 128 with the corresponding diagnostic tool 146 or electronic communication device 150 for the registered user 142 The diagnostic analysis server 104 uses the diagnostic and vehicle identification information in the query to identify the registration data for users in the user database 112 who have previously generated similar diagnostic data using the diagnostic tools 144 to assist the user 120.

To identify the user registration data for accounts that receive a request for contact with the user 120, the diagnostic analysis server 104 identifies the user registration data in the user database 112 that are associated with diagnostic records in the diagnostic history database 108 that are similar to previously generated diagnostic records from one or more of the diagnostic tools 144 and the corresponding users 140. The user accounts that generated the diagnostic reports are produced by the users 140 who have encountered similar DTCs and have worked on the same or similar vehicle makes and models. In instances where the DTCs do not correspond to relevant diagnostic records, the diagnostic analysis server 104 identifies registered users with stored diagnostic data that indicate the users have performed maintenance on the same make and model of vehicle that is identified in the VIN from the diagnostic tool 124.

The diagnostic analysis server 104 applies further criteria to identify the user accounts that receive contact requests. For example, in one configuration the account information for the user 120 includes associations with the accounts for one or more of the users 140. The system 100 generates the associations based on previous interactions between the user 120 and one or more of the other users 140. The diagnostic analysis server 104 also uses the activity of the user accounts that are associated with the other users 140 as a criterion for selection of mechanism. For example, a user account for a user that shows a high level of activity for interaction with other users receive preference over a user account that does not respond to requests for communication.

Process 200 continues as the diagnostic analysis server 104 sends a communication notification to one or more of the identified registered users (block 232). In one configuration, the communication notification includes a request for assistance that is received from the first user 120. The request for assistance includes, for example, diagnostic data that the first diagnostic tool 124 generates during the diagnostic process of the first vehicle, and optionally request data that the user 120 enters to describe the issue with the first vehicle. The communication service 116 sends the contact request to the diagnostic tool or a mobile device that is associated with the user account of the contact, such as the diagnostic tool 146 and mobile device 150 for the user 142 in the illustrative embodiment of FIG. 1. The diagnostic tool 146 and the mobile device 150 displays the contact request including, for example, a summary of the diagnostic data from the diagnostic tool 124 and the request for assistance message from the user 120 that describes the issue in more detail. The user 142 elects to either accept the request for additional communication with the user 120, or declines the request either expressly or by ignoring the request message. During process 200, the chat service 116 sends requests to the diagnostic tools 144 or mobile devices 148 of another one of the users 140 if the user 142 declines the request.

Process 200 continues as the diagnostic analysis server 104 establishes a communication channel for the user 120 and one or more of the other users 140 to communicate with each other regarding the diagnostic data from the vehicle (block 236). In the example of FIG. 1, the user 120 uses the diagnostic tool 124 or mobile device 128 to communicate with either or both of the diagnostic tool 146 and mobile device 150 that are associated with the user 142. The communication service 116 in the diagnostic analysis server 104 provides an instant messaging ("chat") or other communication channel to facilitate communication between the devices that are associated with the users 120 and 142. In addition to human generated communication messages, the communication service 116 enables the first diagnostic device 124 to retrieve additional diagnostic data from the in-vehicle ECU 126 and transmit the additional diagnostic data to the second diagnostic tool 146 or mobile device 150 over the network 132. The users 120 and 142 communicate in either a live mode for immediate communication about the mechanical issue or in a deferred mode when either of users is unavailable for live communication. As described above, in the system 100 the chat data include text and optionally further include video and audio communication and transmission of the diagnostic data from the diagnostic tool 124 for review by the user 142 using the diagnostic tool 146 or electronic communication device 150. The user 120 works with the user 142, and optionally one or more of the other users 140, to resolve the issue with the vehicle.

During process 200, the diagnostic analysis server 104 receives input from the user 120 and one or more of the users 140 to generate a new diagnostic record of the solution to the issue that is stored in the diagnostic history database 108 (block 240). The diagnostic analysis server 104 automatically includes the VIN and DTC and other diagnostic data from the diagnostic tool 124 in the diagnostic record. The VIN and DTC data enable the diagnostic analysis server 104 to retrieve the diagnostic record in the future when another user receives similar DTC data and requires additional information to diagnose an issue with the vehicle. The diagnostic record also includes text or other data that the users 120 and 142 enter manually to describe the issue and the methods for resolving the issue. In addition to a text description, the data in the diagnostic record can include part numbers for any required replacement parts, and pictures or videos that assist in explaining the issue and the procedure to resolve the issue. After performing the repair, the user 120 also provides an estimate of the amount of time required to perform the repair, which assists other users in estimating the cost of repair for the issue.

The diagnostic analysis server 104 stores the diagnostic record in the diagnostic history database 108 in association with the user accounts for the users 120, 142, and the accounts of any other users who assisted in resolving the issue. The diagnostic record provides a potential solution to the issue for other users who operate diagnostic tools or mobile devices that retrieve the diagnostic record from the diagnostic analysis server 104. If another user requires manual assistance in resolving the issue, the diagnostic analysis server 104 retrieves the registration data for user accounts associated with the users who have previous experience with the issue to establish a communication channel between the users to resolve the issue.

Figure 3:
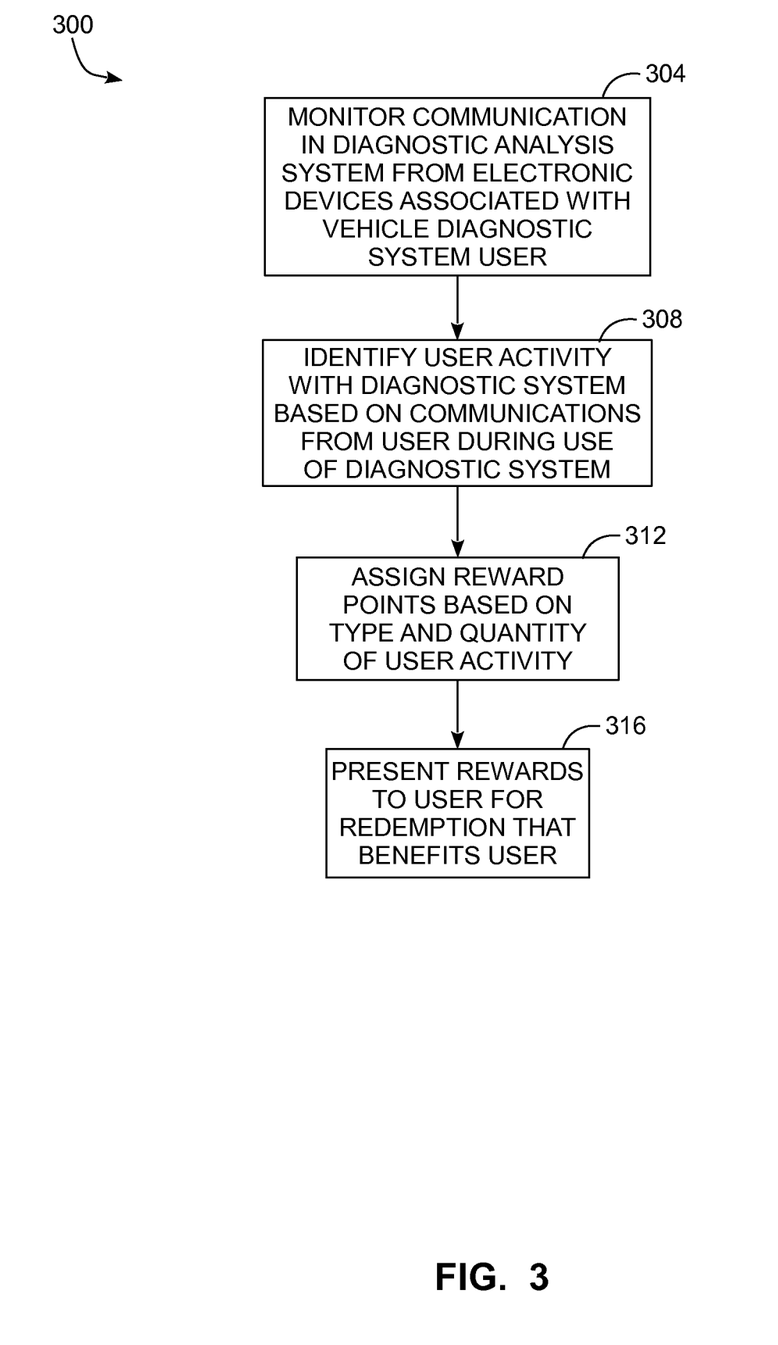
FIG. 3 is a block diagram of a process for monitoring and incentivizing the activities of users in a collaborative automotive diagnostic system.

FIG. 3 depicts a process 300 for operation of the system 100 to incentivize user participation in the system 100. In the discussion below, a reference to the process 300 performing a function or action refers to the execution of stored program instructions by a processor to perform the function or action. Process 300 is described with reference to the system 100 of FIG. 1 for illustrative purposes.

Process 300 begins as the diagnostic analysis server 104 monitors a communication in the vehicle diagnostic system 100 from one or more electronic devices that are associated with a user of the system 100 (block 304). For example, the user 120 operates the diagnostic tool 124 to retrieve diagnostic data from the in-vehicle ECU 126 and the user 120 operates the electronic communication device 128 to submit assistance requests to the system 100 and submit responses to assistance requests from the other users 140 in the system 100.

The user activity service 119 monitors the communications from the diagnostic tool 124 and the electronic device 128 in association with the user account in the user account database 112 for the user 120, and user activity service 119 identifies the type of user activity that corresponds to the electronic communication (block 308). In the embodiment of FIG. 1, the diagnostic analysis server 104 receives the communications with the user communication service 116, and the user activity service 119 receives a copy of the communication. The diagnostic analysis server 104 generates suggestions or transmits assistance requests between the electronic devices that are associated with users as described above with reference to the process 200. The user activity service 119 also identifies the content of the electronic communication to identify the type of activity that the user 120 has performed. For example, if the electronic communication includes diagnostic data such as vehicle DTCs or other diagnostic data, then the user activity service 119 identifies that the mechanic 120 is performing a diagnostic procedure with the diagnostic tool 124. The user activity service 119 also identifies assistance request messages or request response messages from the diagnostic tool 124 or electronic communication device 128 based on metadata in the communication messages. For example, in one embodiment an assistance request message includes a message header field that specifies the message is a request for assistance, and responses to request messages include similar header information that identify the message as a response to a request and optionally identify the original request message.

Process 300 continues as the vehicle diagnostic system 100 assigns one or more reward points to a user account associated with the user in response to the identified user activity (block 312). In the diagnostic analysis server 104, the reward update service 118 receives the user activity information from the user activity service 119 and identifies an update to reward points that are assigned to the user account of the user 120. The user database 112 stores the number of reward points that are assigned to the user 120, and the reward update service 118 adjusts the number of reward points that are associated with the user account for the user 120. In one embodiment, the update service 118 receives a predetermined set of reward point rules from an administrator. The reward point rules associate a predetermined usage activity for the diagnostic tool with a reward, which is expressed in terms of "points" or another numeric reward value. For example, the basic action of connecting the diagnostic tool 124 to the ECU 126 corresponds to predetermined reward of one point. If the user 120 uses one or more advanced functions with the diagnostic tool software or performs a test that is part of a beta testing profile, the reward update service 118 adds additional reward points based on the recorded activity and the predetermined reward levels. As described above, the reward update service 118 may assign a greater number of reward points to favor some activities, such as assigning a greater number of reward points to the user account of the user 120 for a response to a request for assistance from the electronic communication device 128 in comparison to the reward points assigned when the diagnostic analysis server 104 receives a request for assistance from the electronic communication device 128.

In some instances, the reward update service 118 receives reward rules with a time limited function. For example, to encourage use of the diagnostic tool 124 on a regular basis, the reward update service 118 applies additional reward points for diagnostic tool activity over a one week period. The diagnostic reward server 104 presents an announcement of the additional rewards through the user reward web portal 130 to encourage the user 120 to use the diagnostic tool 124. During the process 300, the diagnostic tool 124 generates timestamps corresponding to the time at which the diagnostic tool 124 or electronic communication device 128 sends a communication message corresponding to activity for the user 120, and the reward update service 118 receives the time stamp information to identify an appropriate reward for the time limited reward offer.

In addition to receiving diagnostic activity information, the reward update service 118 receives an update when the user 120 uses the diagnostic tool 124, mobile device 128, or another computing device to purchase additional diagnostic software for the diagnostic tool 124. In one embodiment, the user 120 uses a web application in the diagnostic tool 124 to purchase software upgrades from the user reward web portal 130. In another embodiment, the user 120 purchases the software through the web portal 130 using the mobile device 128 or a PC. The reward update service 118 optionally adds a predetermined number of reward points to the user account for the user 120 in response to the software purchase.

During process 300, the vehicle diagnostic system generates an output to present the accumulated reward points to the user and enable the user to redeem some or all of the reward points to receive a benefit for activity in the diagnostic analysis system 100 (block 316). To review and redeem reward points, the user 120 uses a web application in the diagnostic tool 124, mobile device 128, or another computing device to access the user reward web portal 130. The user 120 uses a username and password, cryptographic key, or other suitable authentication process to access an individual account for the user 120. The user reward web portal 130 displays the reward points for the user 120 that the diagnostic reward server 104 assigns to the user 120 based on the use of the diagnostic tool 124. The user 120 then selects different products or services and a corresponding discount for the product or service based on the number of available reward points. For example, the user 120 receives discounts for purchases of software for the diagnostic tool 124, another diagnostic tool, other automotive repair tools, and automotive parts that are purchased through the user reward web portal 130. The user reward web portal 130 also offers discounts for services such as training for the user 120. In other embodiments, the rewards are for non-monetary services or benefits to the user in the diagnostic analysis server 104. For example, the user 120 optionally redeems reward points to have the diagnostic server 104 send a request for assistance from the user 120 to one of the users 140, such as the user 142, who has received strong positive feedback ratings when answering previous diagnostic queries from other users. The diagnostic server 104 transmits the request message to the electronic communication device 150 that is associated with the user 142 based on the feedback ratings associated with the user account of the user 142 in the user database 112. As the user 120 redeems reward points, the analysis server 104 deducts the redeemed reward points from the total number of reward points that are associated with the user account in the user database 112.

Figure 4:
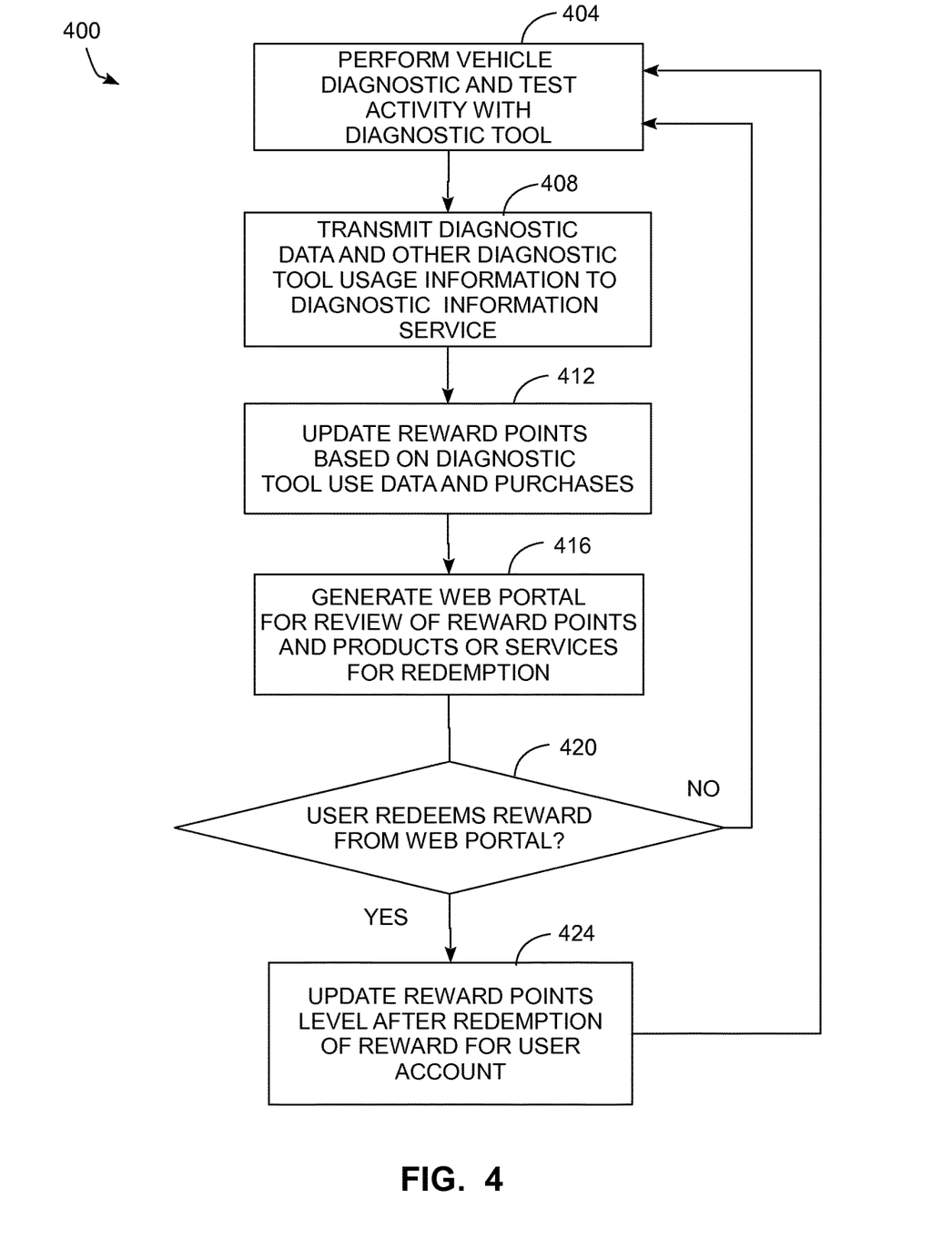
FIG. 4 is a block diagram of a process for providing incentives for the use of the diagnostic tools to mechanics who are users of the diagnostic tools.

As described above, the process 300 monitors the activity of users in the vehicle diagnostic system 100 to assign rewards that the users redeem to receive a benefit for continued activity in the system 100. FIG. 4 depicts a process 400 for the operation of the system 100 to monitor the usage of a diagnostic tool and provide reward points to a user of the diagnostic tool for reward redemption in more detail. In the discussion below, a reference to the process 400 performing a function or action refers to the execution of stored program instructions by a processor to perform the function or action. Process 400 is described with reference to the system 100 of FIG. 1 for illustrative purposes.

During process 400, a mechanic connects a diagnostic tool to an ECU in a vehicle to retrieve DTCs and other diagnostic data from the ECU and to optionally perform tests or other diagnostic procedures for automotive maintenance (block 404). In the illustrative embodiment of FIG. 1, the user 120 connects the diagnostic tool 124 to the ECU 126 using, for example, an OBD-II data port in the vehicle. The diagnostic tool 124 and ECU 126 use a CAN bus or other in-vehicle data network to transfer stored DTCs and other diagnostic data to the diagnostic tool 124. The user 120 optionally enters input to the diagnostic tool 124 to perform advanced diagnostic procedures to further diagnose DTCs or other anomalous diagnostic data. During the vehicle repair process, the user 120 optionally uses the diagnostic tool 124 to perform tests in which the diagnostic tool 124 transmits a command to the ECU 126. In response to the command, the ECU 126 operates on or more in-vehicle components to verify, for example, that a vehicle repair has resolved a maintenance issue with the vehicle.

In the diagnostic tool 124, the processor executes loadable software modules or optional software utilities to perform some of the advanced diagnostic and testing functionality. Some of the optional software modules or utilities are purchased separately from the vendor of the diagnostic tool 124 after the original purchase of the tool. In another situation, the user 120 participates in a beta test program where the diagnostic tool 124 executes a diagnostic program that is still in the process of being developed. During the beta test program, the user 120 uses the diagnostic tool 124 to test the software that is under development. The tests identify defects in new features that are added from an older version of the software and potential defects in existing functionality that is retained from the older versions of the software.

Process 400 continues as the diagnostic tool 124 transmits the diagnostic data and diagnostic tool usage information to the diagnostic reward server 104 (block 408). In the system 100, the diagnostic tool 124 includes a wireless network device, such as an 802.11 compatible wireless LAN or a wireless WAN networking device, which transmits the data through the network 132 to the user activity service 119 in the diagnostic reward server 104. In a wireless network embodiment, the diagnostic tool 124 transmits the diagnostic data and tool usage data to the diagnostic reward server 104 in a background process while the mechanic 104 performs the maintenance activity, and the transmission process does not interrupt or alter the workflow for the user 120 while using the diagnostic tool 124. In another embodiment, the diagnostic tool 124 includes a wired network interface, such as Ethernet, that transmits the data when the diagnostic tool 124 is connected to the wired network. In still another embodiment, a diagnostic tool stores the data in a removable data storage device, and the data storage device is connected to another computing device, such as a PC, that transmits the data and the identifier to the diagnostic reward server 104.

The diagnostic tool 124 includes an identifier in the data transmission that identifies the diagnostic tool 124 or the user 120 to enable the diagnostic reward server 104 to associate the diagnostic data and diagnostic tool activity records with the user account for the user 120. In one embodiment, the diagnostic tool 124 includes a unique hardware address, such as a MAC address or other identifier, that the diagnostic tool 124 includes in each transmission to identify the diagnostic tool 124. In the diagnostic reward server 104, the user database 112 stores the hardware address of the tool 124 in association with the user account for the user 120. In another embodiment, the diagnostic tool 124 transmits a user name or other identifier for the user 120 with the diagnostic data.

The user activity service 119 receives the diagnostic data including DTCs, sensor readings from one or more in-vehicle sensors, diagnostic test results, and optionally the VIN or other vehicle identification data that are received from the ECU. While not expressly illustrated in FIG. 1, the diagnostic reward server 104 and other online data collection services use the diagnostic data from a large number of vehicles to assist, for example, mechanics in performing repairs, track widespread maintenance issues with vehicles, and identify the demand for replacement parts that are used in repairs. The tool usage information is a record of software functionality that a mechanic used while the diagnostic tool 124 is connected to the vehicle, and includes a record of any advanced functionality that the mechanic performed.

During process 400, the diagnostic reward server 104 updates reward points that are assigned to a user account for the user 120 in response to receiving the usage data from the diagnostic tool 124 and in response to software purchases that the user 120 performs using the diagnostic reward server 104 (block 412). In the diagnostic analysis server 104, the reward update service 118 assigns the reward points in a similar manner to the processing that is described above in block 312 of the process 300.

Process 400 continues as the diagnostic reward server 104 updates the reward points for the user account of the user 120 as the user 120 uses the diagnostic tool 124 during the course of vehicle maintenance and repair of one or more vehicles (block 420). The user 120 typically performs maintenance operations on multiple vehicles and accumulates reward points as described by the processing described above in blocks 204-216.

After accumulating reward points, the user 120 reviews and redeems some or all of the reward points using the web portal 130 (block 420). During process 400 the system 100 performs the reward point review and redemption process in a similar manner to the processing of block 316 during the process 300.

Once the user 120 redeems the reward points for a discount on items or services, the diagnostic reward server 104 updates the number of reward points that are assigned to the user account for the user 120 (block 424). In the system 100, the user reward web portal 130 permits the user 120 to redeem any or all of the reward points that are associated with the user account for the mechanic, and reduces the balance of reward points accordingly. Process 400 then returns to the processing that is described with reference to block 204 as the user 120 continues to use the diagnostic tool 124 and accumulates additional reward points.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed is:

1. A method of operating a vehicle diagnostic system comprising:
retrieving diagnostic data from a first processor in a first vehicle using a first diagnostic tool in response to connection of the diagnostic tool to the processor by a first user;

transmitting with the first diagnostic tool the diagnostic data to a server;
transmitting with the first diagnostic tool a request for assistance regarding a vehicle issue corresponding to the diagnostic data to the server;
identifying with the server registration data associated with a second user who has received diagnostic data from a second processor in a second vehicle with a second diagnostic tool that corresponds to the diagnostic data retrieved from the first processor in the first vehicle; and
transmitting a communication notification from the server to an electronic communication device that is associated with the second user to establish a communication channel between the first user and the second user for communication regarding the vehicle issue.

2. The method of claim 1 the transmission of the communication notification further comprising:
transmitting the communication notification from the server to the second diagnostic tool.

3. The method of claim 2, the transmission of the communication notification further comprising:
transmitting with the server the request for assistance to the second diagnostic tool.

4. The method of claim 2 further comprising:
establishing the communication channel between the first diagnostic tool and the second diagnostic tool to enable communication between the first user and the second user.

5. The method of claim 4 further comprising:
retrieving additional diagnostic data from the first processor in the first vehicle using the first diagnostic tool; and
transmitting with the first diagnostic tool the additional diagnostic data through the communication channel to the second diagnostic tool to enable the second user to review the additional diagnostic data using the second diagnostic tool.

6. The method of claim 1 further comprising:
establishing the communication channel between the first diagnostic tool and a mobile electronic device associated with the second user to enable communication between the first user and the second user.

7. The method of claim 6 further comprising:
retrieving additional diagnostic data from the first processor in the first vehicle using the first diagnostic tool; and
transmitting with the first diagnostic tool the additional diagnostic data through the communication channel to the mobile electronic device to enable the second user to review the additional diagnostic data using the mobile electronic device.

8. The method of claim 1, the identification of the registration data associated with the second user further comprising:
retrieving with the first diagnostic tool a vehicle identification number (VIN) from the first processor in the first vehicle;
transmitting with the first diagnostic tool the VIN to the server;
identifying with the server at least one of a make and a model of the first vehicle with reference to the VIN; and
identifying with the server the registration data associated with the second user with reference to another VIN corresponding to the at least one make and model of the first vehicle, the other VIN being received from the second diagnostic tool associated with the second user.

9. The method of claim 1, the identification of the registration data associated with the second user further comprising:
retrieving with the first diagnostic tool a diagnostic trouble code (DTC) from the first processor in the first vehicle;
transmitting with the first diagnostic tool the DTC to the server; and
identifying with the server the registration data associated with the second user in response to diagnostic history data associated with the second user including the DTC received from the second diagnostic tool associated with the second user.

10. A method of operating a vehicle diagnostic system comprising:
retrieving diagnostic data from a first processor in a first vehicle using a first diagnostic tool in response to connection of the diagnostic tool to the processor by a first user;
transmitting with the first diagnostic tool the diagnostic data to a server;
identifying with the server a first repair procedure in a plurality of repair procedures with reference to a plurality of rankings for the plurality of repair procedures corresponding to the diagnostic data from the first diagnostic tool, the first repair procedure having a highest ranking in the plurality of rankings;
transmitting with the server the first repair procedure to the first diagnostic tool;
transmitting feedback from the first diagnostic tool corresponding to effectiveness of the first repair procedure; and
updating with the server the ranking associated with the first repair procedure in response to the feedback.

11. The method of claim 10 further comprising:
identifying with the server a second repair procedure in the plurality of repair procedures having a second highest ranking with reference to the plurality of rankings;
transmitting with the server the second repair procedure to the first diagnostic tool in response to receiving negative feedback for the first repair procedure; and
reducing with the server the ranking of the first repair procedure in response to the negative feedback from the first diagnostic tool.

12. The method of claim 10 further comprising:
increasing with the server the ranking of the first repair procedure in response to positive feedback from the first diagnostic tool.

13. A vehicle diagnostic system comprising:
a first diagnostic tool associated with a first user;
a second diagnostic tool associated with a second user;
a server;
and an electronic communication device associated with the second user;
the first diagnostic tool being configured to:
retrieve diagnostic data from a first processor in a first vehicle;
transmit the diagnostic data to the server; and
transmit a request for assistance regarding a vehicle issue corresponding to the diagnostic data to the server; and
the server being configured to:
identify registration data associated with a second user who has received diagnostic data from a second processor in a second vehicle with the second diagnostic tool that corresponds to the diagnostic data retrieved from the first processor in the first vehicle; and transmit a communication notification from the server to the electronic communication device that is associated with the second user to establish a communication channel between the first user and the second user for communication regarding the vehicle issue.

14. The vehicle diagnostic system of claim 13 wherein the electronic communication device associated with the second user is the second diagnostic tool, and the server being further configured to:

transmit the communication notification to the second diagnostic tool.

15. The vehicle diagnostic system of claim 14, the server being further configured to:

transmit the communication notification including the request for assistance to the second diagnostic tool.

16. The system of claim 14, the first diagnostic tool being further configured to:

retrieve additional diagnostic data from the first processor in the first vehicle; and transmit the additional diagnostic data through the communication channel to the second diagnostic tool to enable the second user to review the additional diagnostic data using the second diagnostic tool.

17. The system of claim 13, the first diagnostic tool being further configured to:

retrieve with the first diagnostic tool a vehicle identification number (VIN) from the first processor in the first vehicle;

transmit the VIN to the server; and the server being further configured to:

identify at least one of a make and a model of the first vehicle with reference to the VIN; and identify the registration data associated with the second user with reference to another VIN corresponding to the at least one make and model of the first vehicle, the other VIN being received from the second diagnostic tool associated with the second user.

18. The system of claim 13, the first diagnostic tool being further configured to:

retrieve a diagnostic trouble code (DTC) from the first processor in the first vehicle; and transmit the DTC to the server; and the server being further configured to:

identify the registration data associated with the second user in response to diagnostic history data associated with the second user including the DTC received from the second diagnostic tool associated with the second user.

* * * * *